Oct. 10, 1950     I. WOLFF     2,525,328
RADAR SYSTEM
Filed June 25, 1945
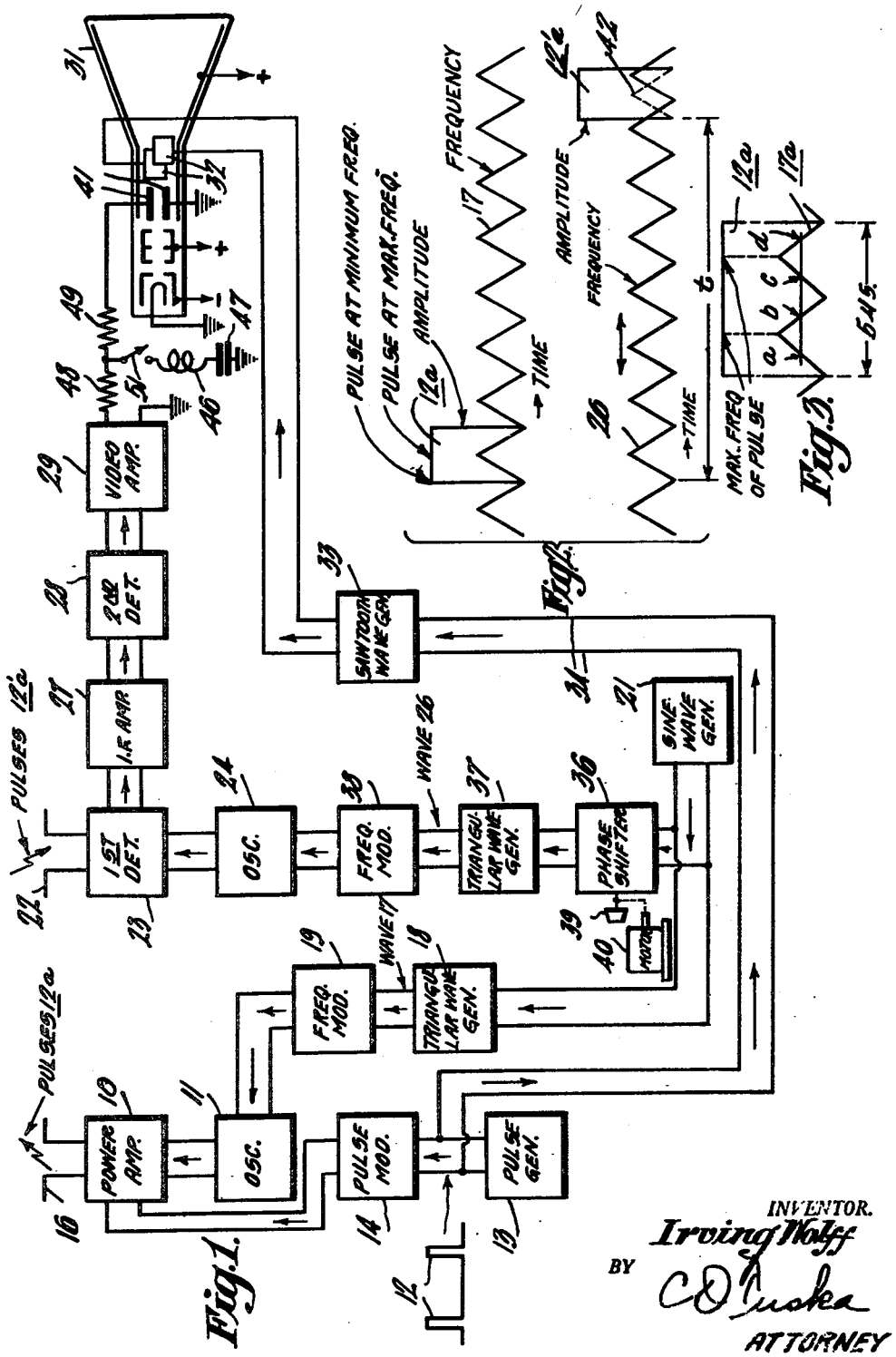
INVENTOR.
Irving Wolff
BY
ATTORNEY Patented Oct. 10, 1950

2,525,328

UNITED STATES PATENT OFFICE 2,525,328

RADAR SYSTEM

Irving Wolff, Princeton, N. J., assignor to Radio Corporation of America, a corporation of Delaware Application June 25, 1945, Serial No. 601,359

8 Claims. (Cl. 343—13)

My invention relates to radar systems and particularly to systems of the pulse-echo type.

The object of the invention is to provide in a radar system an improved method of and means for reducing the effects of interfering signals, such as jamming signals or unintentional signals from other transmitters.

In practicing the invention, the radio pulse transmitter of the radar system is provided with means for frequency modulating the pulse of radio frequency energy and for similarly frequency modulating a local oscillator in the radar receiver which is of the superheterodyne type. The carrier wave frequency of the reflected pulse at the receiver and the frequency of the local oscillator differ by the desired intermediate frequency provided the frequency modulation of the local oscillator is adjusted to be in phase with that of the received pulse. Thus, the reception of the frequency-modulated pulses results in pulses of I.-F. signal of reasonably constant I.-F. carrier frequency being passed by the I.-F. amplifier. On the other hand, the reception of pulses or other signals having a constant carrier frequency, or having a frequency that does not vary in the correct manner, results in an I.-F. signal that has its frequency varied through such a wide range by the local oscillator that only a small part of such signals is passed by the I.-F. amplifier.

The invention will be better understood from the following description taken in connection with the accompanying drawing in which:

Figure 1 is a block diagram of a radar system embodying the invention,

Figure 2 is a group of graphs that are referred to in explaining the operation of the system shown in Fig. 1, and Figure 3 is a group of graphs that are referred to in describing a modification of the system shown in Fig. 1.

Referring to the drawing, the invention is shown applied to a pulse-echo radar system comprising a radio pulse transmitter that includes a power amplifier 10 and a radio frequency oscillator 11. The power amplifier 10 is pulse modulated by electrical pulses 12 which are supplied from a pulse generator 13 to a pulse modulating circuit 14. Thus, radio frequency pulses 12a (Fig. 2) are radiated from the transmitter antenna 16 (Fig. 1).

The R.—F. pulses 12a are frequency modulated as, for example, by a triangular wave 17 (Fig. 2) that is produced by a triangular wave generator 18 (Fig. 1). The modulating wave 17 may be applied to the oscillator 11 through a frequency-modulation circuit 19 which may be a reactance tube, for example. It may be preferred to produce the frequency modulation by direct application of the modulating wave 17 to the oscillator 11, particularly if the oscillator is a magnetron or a reflection type velocity modulated tube, for example. Also, it may be preferred to pulse modulate the oscillator 11 itself instead of the power amplifier 10. In this case the power amplifier may be omitted. For reasons that will become apparent, the triangular wave 17 preferably is produced from, or synchronized with, a sine wave voltage supplied from a sine wave generator 21.

Referring now to the receiving portion of the system, an antenna 22 picks up the R.-F. pulses 12a reflected back to the radar system and supplies them to a first detector 23 of a superheterodyne receiver. A local oscillator 24, which is frequency modulated by a triangular wave 26 (Fig. 2), applies signal to the detector 23 whereby an intermediate-frequency signal is obtained. The receiver further comprises an I.-F. amplifier 27, a second detector 28, a video frequency amplifier 29 and a cathode ray indicator tube 31.

The cathode ray of the tube 31 is deflected horizontally along a distance axis by applying a sawtooth wave to a pair of deflecting plates 32. This sawtooth wave is supplied from a sawtooth wave generator 33 which is synchronized with the transmitted pulses by pulses supplied over conductors 34 from the generator 13.

The circuit for frequency modulating the local oscillator 24 includes a phase shifter 36 through which sine waves are supplied to a triangular wave generator 37 from the generator 21. The generator 37 supplies the triangular waves 26 (which are similar to the waves 17) to a frequency-modulating circuit 38. The comments regarding the frequency-modulating circuit 19 and the oscillator 11 also apply to the modulating circuit 38 and the local oscillator 24. It will be seen that the phase or timing of the triangular wave 26 may be shifted with respect to the triangular wave 17 by operating a control knob 39 on the phase shifter 36. Since the tubes in the circuit 11, 19 may have different characteristics than those in the circuit 24, 38, it may be desirable to adjust the shaft of either the wave 17 or the wave 26 to obtain the same rate of frequency change for oscillator 24 as for oscillator 11.

Referring more specifically to the operation of the system, it will be assumed by way of example that the frequency of the transmitter oscillator 11 is swung from 200 megacycles per second to 204 megacycles per second and back to 200 megacycles by the triangular wave 17, and that the local oscillator 24 is swung from 170 megacycles per second to 174 megacycles per second and back to 170 megacycles by the triangular wave 26, the frequency of the I.-F. carrier in this case to be 30 megacycles. It may be assumed that the duration of each radio pulse 12a is 5 microseconds; and that the repetition rate of the triangular waves 17 and 26 is 200 kilocycles per second, the corresponding repetition period of waves 17 and 26 being 5 microseconds.

The repetition rate of the radio pulses is selected in the usual manner in accordance with the range of distances to be covered by the radar system. The distance to a reflecting surface is shown on the indicator tube 31 in the usual way, the video frequency pulses from the amplifier 29 being applied to the vertical deflecting plates 41 to produce a "pip" on the horizontal cathode ray trace.

The pass band of the I.-F. amplifier 27 is made just wide enough to pass the received pulses with reasonably good fidelity. A pass band 0.4 megacycle wide, for example, is satisfactory.

The phase relation of the triangular wave 17 to the transmitted pulse 12a is not important, but the phase relation shown in Fig. 2 will be assumed for the purpose of illustration. In this instance the frequency of the carrier wave is a maximum at the middle of the R.-F. pulse 12a.

The reflected R.-F. pulse 12'a when received at a time $t$ after transmission will, of course, have the original frequency modulation thereon as indicated by the dotted lines 42. The frequency modulation of the local oscillator 24 is, of course, in phase with the modulating wave 26, and its phase or timing can be changed by adjusting the phase shifter knob 39.

In operating the radar system, the phase shifter knob 39 is adjusted until the frequency modulation of the local oscillator 24 is substantially in phase with the frequency modulation (indicated at 42) on the received pulse 12'a. A pulse corresponding to pulse 12'a will be seen on the screen of tube 31. The frequency difference between the received signal and the local oscillator signal is now always 30 megacycles per second or close to 30 megacycles per second, this being the mid-frequency to which the I.-F. amplifier 27 is tuned. This is on the assumption that the reflecting object or target is stationary.

It may be noted that there are a series of target distances from which reflected pulses will arrive at the receiver in phase to produce pulse indications as above described. In the example described, these distances are about one-half mile apart. For distances between these points the received pulse will appear to be considerably weakened. This is caused by the fact that the received frequency and the beat oscillator frequency are not in phase and therefore the difference frequency will only be close to 30 megacycles and therefore pass through the sharp I.-F. amplifier for a relatively short portion of the time.

However, if the object is fixed in distance the phase shift knob can always be manipulated so as to bring the received pulse modulation in phase with the beat frequency oscillator modulation, thus making the received pulse intermediate frequency such that it can pass through the I.-F. amplifier.

It will be apparent that if the target is moving toward or away from the radar system, the pulses reflected from the target will cause the pulse indication on the screen to appear and disappear periodically if the phase shifter setting is fixed. Such disappearance of the target indication may be avoided by manually adjusting the phase shifter 36 to follow the target as it approaches or recedes.

It may be desirable to have the phase shifter knob 39 rotated continuously by a motor 40, particularly when the radar system is searching for enemy targets. It will be apparent from the above comments that a continuous shifting of the phase in this manner will reduce the chance of missing a target because of its being located at an "out of phase" distance.

From the foregoing it will be evident that ordinary radio pulses, i. e., ones that are not frequency modulated, will be swept through a frequency range of 4 megacycles by the local oscillator 24 so that most of their energy will not be passed by the comparatively narrow pass-band I.-F. amplifier 27. Most other types of interfering signals will also be at least partially rejected as a result of the frequency sweep on the local oscillator.

It will be understood that the invention is not limited to the use of the triangular waves as described above for frequency modulation. Instead of the triangular waves 17 and 26, sawtooth waves or sine waves may be employed.

Fig. 3 illustrates a modification of the system operation described above. In this arrangement the frequency modulating wave 17 is replaced by a triangular wave 17a of twice the repetition rate of wave 17, i. e., a repetition rate of 400 kilocycles per second in the example assumed. Likewise, the modulating wave 26 is replaced by a wave like the wave 17a. An advantage of this arrangement is that if substantially constant frequency signals are being picked up by the receiver antenna, the local oscillator frequency may sweep periodically to a frequency that differs from the pulse carrier frequency by the I.-F. carrier frequency value. Thus, in the particular example illustrated in Fig. 3, short pulses of signal at the I.-F. carrier frequency are produced at the times indicated at $a$, $b$, $c$ and $d$ and at a repetition rate of 800 k. c. per second. Fig. 3 represents the case of the maximum repetition rate for these short I.-F. pulses. The minimum rate is 400 k. c. per second but there may be higher frequency harmonics. Since the undesired short pulses occur at a definite minimum repetition rate they may be eliminated by including in the video frequency circuit a rejection circuit, such as a series-resonant circuit 46, 47 that is tuned to said minimum repetition rate. In the example illustrated, the rejection circuit 46, 47 may be connected between ground and the junction point of two resistors 48 and 49 by means of a switch 51. The higher frequency components which also will exist may be rejected also since it is not necessary to have the amplifier much wider than 200 k. c. to pass the signal pulse.

It will also be apparent that other phasing arrangements than the one described may be employed. For example, the phase shifter 36 may be removed from the location shown and placed in the transmitter frequency modulating circuit (preceding the generator 18) for adjusting the phase of the frequency modulation on the radio pulse.

I claim as my invention:

1. A system of the pulse-echo type comprising means for producing pulses of radio carrier wave energy, means for frequency modulating the carrier wave of said pulses, means for transmitting said modulated pulses whereby they are reflected back upon striking a reflecting surface, a superheterodyne receiver for receiving said pulses after reflection, said receiver including a first detector, a local oscillator and an intermediate-frequency amplifier, said amplifier having a frequency pass band that is narrow compared with the frequency swing of said frequency modulation, and means for frequency modulating said local oscillator with substantially the same frequency swing as the frequency modulation on said received pulses and substantially in phase therewith, the mean frequency of said radio pulses and the mean frequency of said local oscillator differing by an amount at least approximately equal to the mid-frequency to which said intermediate-frequency amplifier is tuned.

2. A system of the pulse-echo type comprising means for producing pulses of radio carrier wave energy, means for linearly frequency modulating the carrier wave of said pulses, means for transmitting said modulated pulses whereby they are reflected back upon striking a reflecting surface, a superheterodyne receiver for receiving said pulses after reflection, said receiver including a first detector, a local oscillator and an intermediate-frequency amplifier, said amplifier having a frequency pass band that is narrow compared with the frequency swing of said frequency modulation, and means for also linearly frequency modulating said local oscillator with substantially the same frequency swing as the frequency modulation on said received pulses and substantially in phase therewith, the mean frequency of said radio pulses and the mean frequency of said local oscillator differing by an amount at least approximately equal to the mid-frequency to which said intermediate-frequency amplifier is tuned.

3. A system of the pulse-echo type comprising means for producing pulses of radio carrier wave energy, means for producing a frequency-modulating wave having a certain repetition rate, means for frequency modulating the carrier wave of said pulses by said frequency-modulating wave, means for transmitting said modulated pulses whereby they are reflected back upon striking a reflecting surface, a superheterodyne receiver for receiving said pulses after reflection, said receiver including a first detector, a local oscillator and an intermediate-frequency amplifier, said amplifier having an intermediate-frequency pass band that is narrow compared with the frequency swing of said frequency modulation, means for producing a second frequency-modulating wave, and means for frequency modulating said local oscillator by said second frequency-modulating wave with substantially the same frequency swing as the frequency modulation on said received pulses and substantially in phase therewith, the mean frequency of said radio pulses and of said local oscillator differing by a frequency that lies within said intermediate-frequency pass band.

4. The invention according to claim 3 wherein the repetition period of said frequency-modulating waves does not substantially exceed the duration of each of said pulses.

5. The invention according to claim 3 wherein the repetition period of said frequency-modulating waves does not substantially exceed one-half the duration of each of said pulses.

6. The invention according to claim 3 wherein means comprising a phase shifter is provided for shifting the phase of one of said frequency-modulating waves with respect to the other frequency-modulating wave.

7. The invention according to claim 3 wherein means comprising a phase shifter is provided for shifting the phase of one of said frequency-modulating waves with respect to the other frequency-modulating wave, and wherein a motor is coupled to said phase shifter for continuously shifting the phase of said one frequency-modulating wave.

8. The invention according to claim 3 wherein said receiver further includes a second detector for producing a video frequency signal and a video frequency circuit following said second detector, and wherein said video frequency circuit includes a rejection circuit tuned substantially to the repetition rate of said frequency-modulating waves.

IRVING WOLFF.

REFERENCES CITED

The following references are of record in the file of this patent:

UNITED STATES PATENTS

| Number | Name | Date |
| --- | --- | --- |
| Re. 21,955 | Chaffee | Nov. 25, 1941 |
| 2,253,975 | Guanella | Aug. 26, 1941 |
| 2,407,644 | Benioff | Sept. 17, 1946 |
| 2,423,088 | Earp | July 1, 1947 |
| 2,423,644 | Evans | July 8, 1947 |
| 2,424,796 | Carlson | July 29, 1947 |